US012597084B2

(12) United States Patent
Cheng et al.

(10) Patent No.: US 12,597,084 B2
(45) Date of Patent: Apr. 7, 2026

(54) MOBILITY SCOOTER SHARING SYSTEM AND MANAGING METHOD FOR MOBILITY SCOOTER SHARING SYSTEM

(71) Applicant: MERITS HEALTH PRODUCTS CO., LTD., Taichung City (TW)

(72) Inventors: Ming-Chuan Cheng, Taichung City (TW); Shun-Yuan Cheng, Taichung City (TW)

(73) Assignee: MERITS HEALTH PRODUCTS CO., LTD., Taichung City (TW)

( * ) Notice: Subject to any disclaimer, the term of this patent is extended or adjusted under 35 U.S.C. 154(b) by 0 days.

(21) Appl. No.: 18/735,175

(22) Filed: Jun. 6, 2024

(65) Prior Publication Data

US 2025/0378520 A1     Dec. 11, 2025

(51) Int. Cl.
*G06Q 50/43*          (2024.01)
*B60R 25/045*        (2013.01)
(Continued)

(52) U.S. Cl.
CPC ........... *G06Q 50/43* (2024.01); *B60R 25/045* (2013.01); *G06Q 30/0645* (2013.01);
(Continued)

(58) Field of Classification Search
CPC .... G06Q 50/43; G06Q 30/0645; G07C 5/008; G07C 5/02; G07C 2205/02;
(Continued)

(56) References Cited

U.S. PATENT DOCUMENTS

2014/0266588 A1* 9/2014 Majzoobi ................. B62H 5/20
                                                                  340/5.61
2019/0324446 A1 10/2019 Vanderzanden et al.
(Continued)

FOREIGN PATENT DOCUMENTS

CN       108305147     * 7/2018   ........ G06Q 30/0284
CN       111063062 A     4/2020
(Continued)

OTHER PUBLICATIONS

Isik et al, E-scooter Sharing Platforms, 2023 IEEE 26th Int'l Conference on Intelligent Transportation Systems (ITSC), pp. 5909-5916 (Year: 2023).*

*Primary Examiner* — Michael P Harrington
*Assistant Examiner* — Mark C Clare
(74) *Attorney, Agent, or Firm* — CKC & Partners Co., LLC

(57)          ABSTRACT
A mobility scooter sharing system includes signal broadcasting devices, mobility scooter groups, renting controlling devices, device ID marks and a renting platform. As a mobile device reads the device ID of the renting controlling device corresponding to the mobility scooter, the mobile device sends a renting signal to the renting platform, and the renting platform sends an unlock signal to the renting controlling device. The renting controlling device confirms whether the mobility scooter is within any of the station areas based on the broadcast signal from any of the signal broadcasting devices. If the mobility scooter is judged to be located within any of the station areas, the renting controlling device enables the battery of the mobility scooter, and if the mobility scooter is judged to be not located within any of the station areas, the battery of the mobility scooter is not enabled.

3 Claims, 4 Drawing Sheets

(51) Int. Cl.
    *G06Q 30/0645*      (2023.01)
    *G07C 5/00*        (2006.01)
    *G07C 5/02*        (2006.01)
(52) U.S. Cl.
    CPC .............. *G07C 5/008* (2013.01); *G07C 5/02*
                      (2013.01); *G07C 2205/02* (2013.01)
(58) Field of Classification Search
    CPC ............. B60R 25/045; G05D 2105/24; B62K
              2200/00; G62K 5/00; G62K 5/003; G62K
                      5/007; G62K 5/023; G62K 7/00
    USPC ......................................................... 705/13
    See application file for complete search history.

(56)                References Cited

U.S. PATENT DOCUMENTS

2019/0378055 A1*  12/2019  Whitt ..................... G08G 1/205
2020/0118200 A1*   4/2020  Tian ................... G06Q 30/0645
2021/0166303 A1*   6/2021  Gideon, III .......... G06Q 20/145
2023/0245223 A1*   8/2023  Okai .................. G06Q 30/0261
                                                        705/307

FOREIGN PATENT DOCUMENTS

KR       20200012403     *  2/2020  .............. B62H 5/14
WO        2019109340 A1     6/2019

* cited by examiner

MOBILITY SCOOTER SHARING SYSTEM AND MANAGING METHOD FOR MOBILITY SCOOTER SHARING SYSTEM

BACKGROUND

Field of Invention

The present invention relates to a sharing system and a managing method for a sharing system. More particularly, the present invention relates to a mobility scooter sharing system and a managing method for a mobility scooter sharing system.

Description of Related Art

With the improvement of the technique, bicycle/scooter sharing systems are developed. The bicycle/scooter sharing system includes lots of stations, and lots of bicycles/scooters are locked in the stations. A user may use a mobile device to rent the bicycle/scooter in one of the stations, and then may return the bicycle/scooter in the same one or in another one of the stations, which may improve the using convenience.

However, it is not easy for the elderly to ride the bicycle/scooter, and an improvement is required.

SUMMARY

According to one aspect of the present disclosure, a mobility scooter sharing system includes a plurality of signal broadcasting devices, a plurality of mobility scooter groups, a plurality of renting controlling devices, a plurality of device ID marks and a renting platform. The signal broadcasting devices are respectively located within a plurality of station areas, and each of the signal broadcasting devices broadcasts a broadcast signal. The mobility scooter groups are respectively located within the station areas, each of the mobility scooter groups includes a plurality of mobility scooters, and each of the mobility scooters includes a battery. Each of the renting controlling devices is disposed at and signally connected to each of the mobility scooters, and each of the renting controlling devices includes a device ID and a power switching unit. The plurality of device ID marks are respectively disposed at the mobility scooters or the renting controlling devices, and each of the device ID marks corresponds to the device ID of each of the renting controlling devices. The renting platform is signally connected to the renting controlling devices. As a mobile device reads the device ID mark representing the device ID of a selected one of the renting controlling devices corresponding to a rented one of the mobility scooters, the mobile device sends a renting signal to the renting platform, and the renting platform sends an unlock signal to the selected one of the renting controlling devices. The selected one of the renting controlling devices confirms whether the rented one of the mobility scooters is within any of the station areas based on the broadcast signal from any of the signal broadcasting devices located therewithin, if the rented one of the mobility scooters is judged to be located within any of the station areas, the power switching unit of the selected one of the renting controlling devices enables the battery of the rented one of the mobility scooters, and if the rented one of the mobility scooters is judged to be not located within any of the station areas, the battery of the rented one of the mobility scooters is not enabled.

According to another aspect of the present disclosure, a managing method for a mobility scooter sharing system includes a station area establishing step, a mobility scooter providing step, and a renting managing step. In the station area establishing step, a plurality of signal broadcasting devices are respectively provided in a plurality of station areas, each of the signal broadcasting devices sends a broadcast signal, and the station areas are recorded in a renting platform. In the mobility scooter providing step, a plurality of mobility scooter groups are respectively provided in the station areas. Each of the mobility scooter groups includes a plurality of mobility scooters, and each of the mobility scooters includes a battery. A plurality of renting controlling devices are respectively disposed at and signally connected to the mobility scooters, each of the renting controlling devices is configured to receive the broadcast signal from any of the signal broadcasting devices, and each of the renting controlling devices includes a device ID and a power switching unit. A plurality of device ID marks are respectively disposed at the mobility scooters or the renting controlling devices, and each of the device ID marks corresponds to the device ID of each of the renting controlling devices. In the renting managing step, as a mobile device reads the device ID mark representing the device ID of a selected one of the renting controlling devices corresponding to a rented one of the mobility scooters, the mobile device sends a renting signal to the renting platform, and the renting platform sends an unlock signal to the selected one of the renting controlling devices. The selected one of the renting controlling devices confirms whether the rented one of the mobility scooters is within any of the station areas based on the broadcast signal from any of the signal broadcasting devices located therewithin. If the rented one of the mobility scooters is judged to be located within any of the station areas, the power switching unit of the selected one of the renting controlling devices enables the battery of the rented one of the mobility scooters. If the rented one of the mobility scooters is judged to be not located within any of the station areas, the battery of the rented one of the mobility scooters is not enabled.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
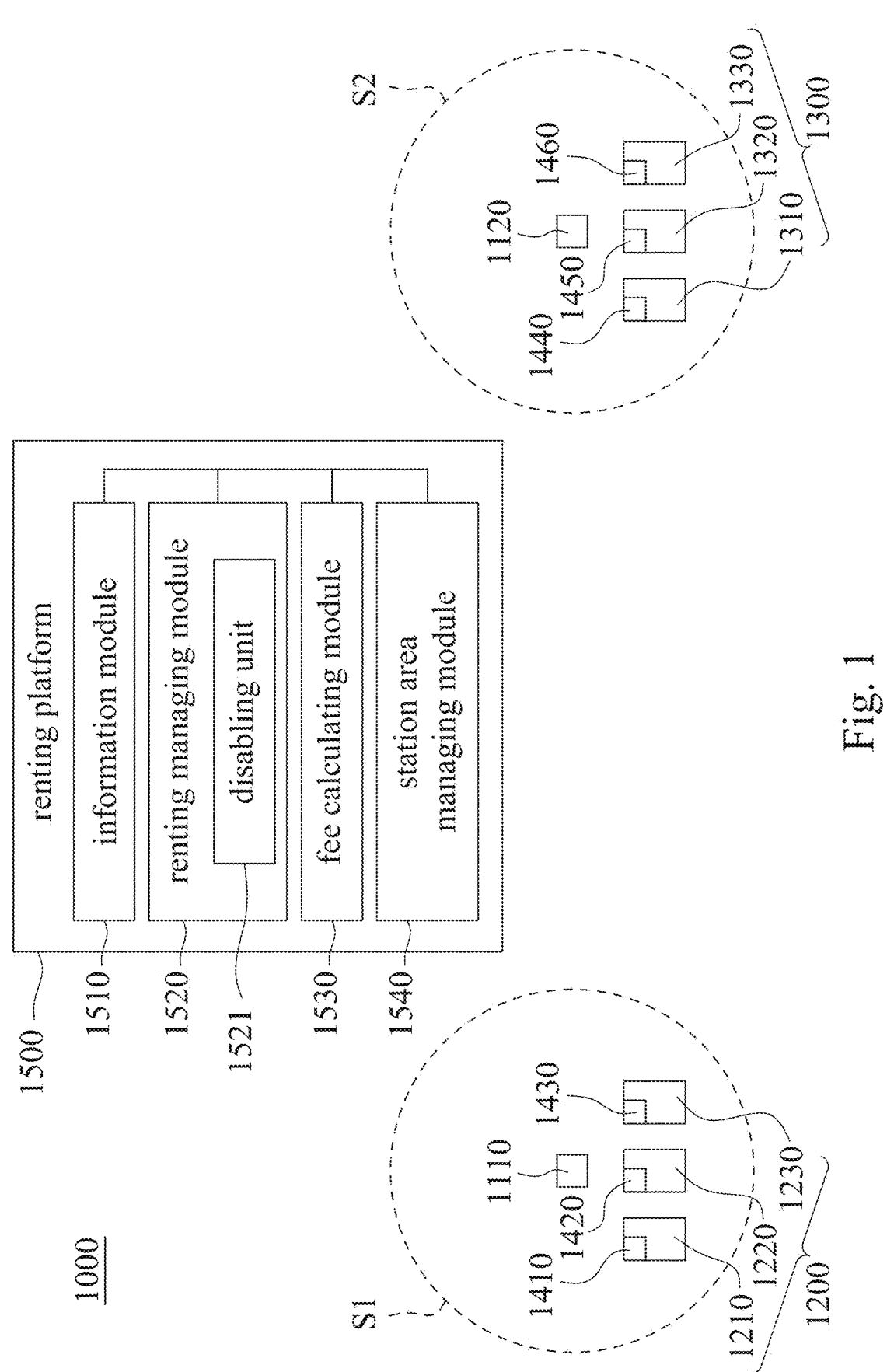
FIG. 1 shows a schematic view of a mobility scooter sharing system according to one embodiment of the present disclosure.

The embodiments of the present disclosure will be illustrated with drawings hereinafter. In order to clearly describe the content, many practical details will be mentioned with the description hereinafter. However, it will be understood by the reader that the practical details will not limit the present disclosure. In other words, in some embodiment of the present disclosure, the practical details are not necessary. Additionally, in order to simplify the drawings, some conventional structures and elements will be illustrated in the drawings in a simple way; the repeated elements may be labeled by the same or similar reference numerals.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 2:
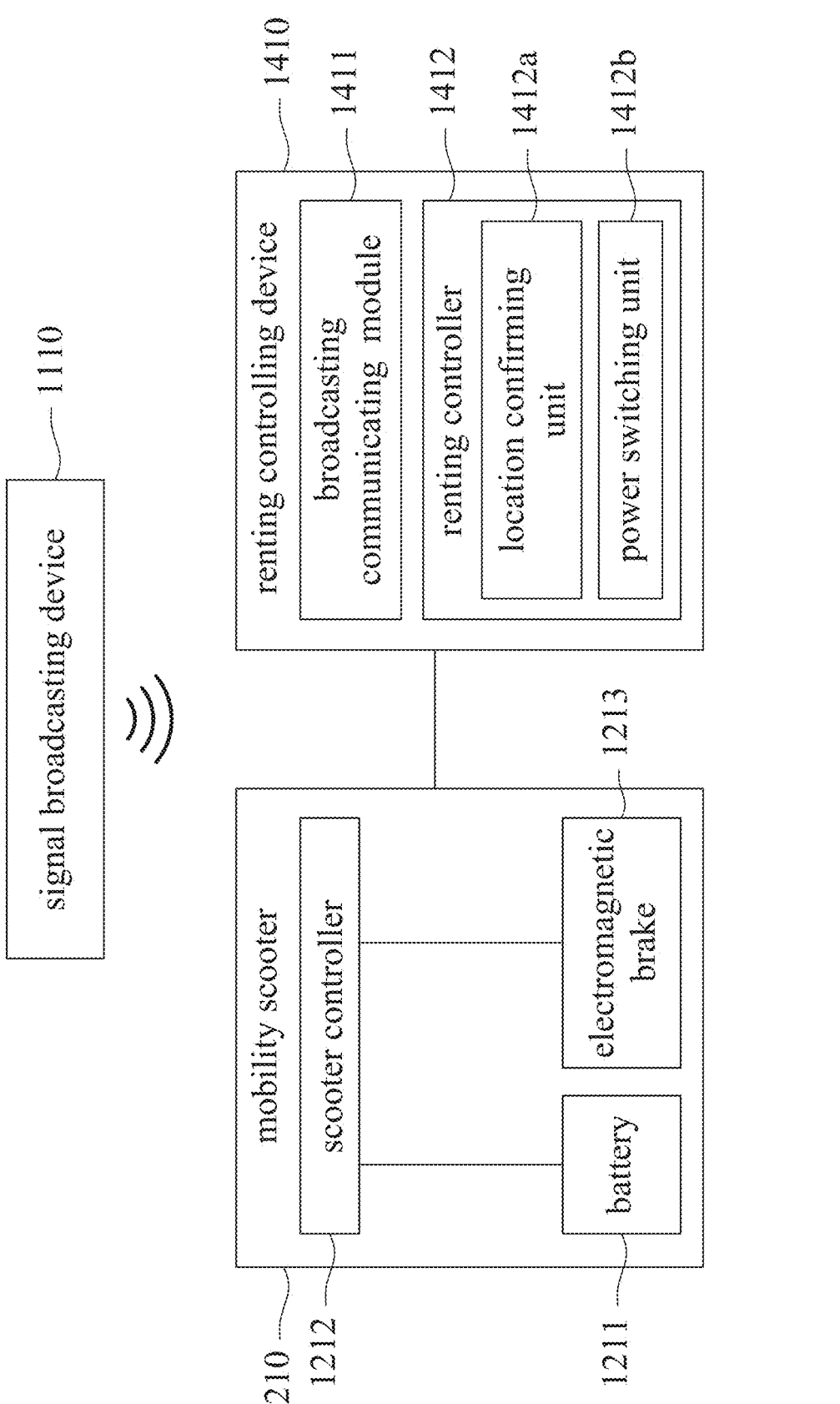
FIG. 2 shows a block diagram of the mobility scooter sharing system of FIG. 1.
Figure 3:
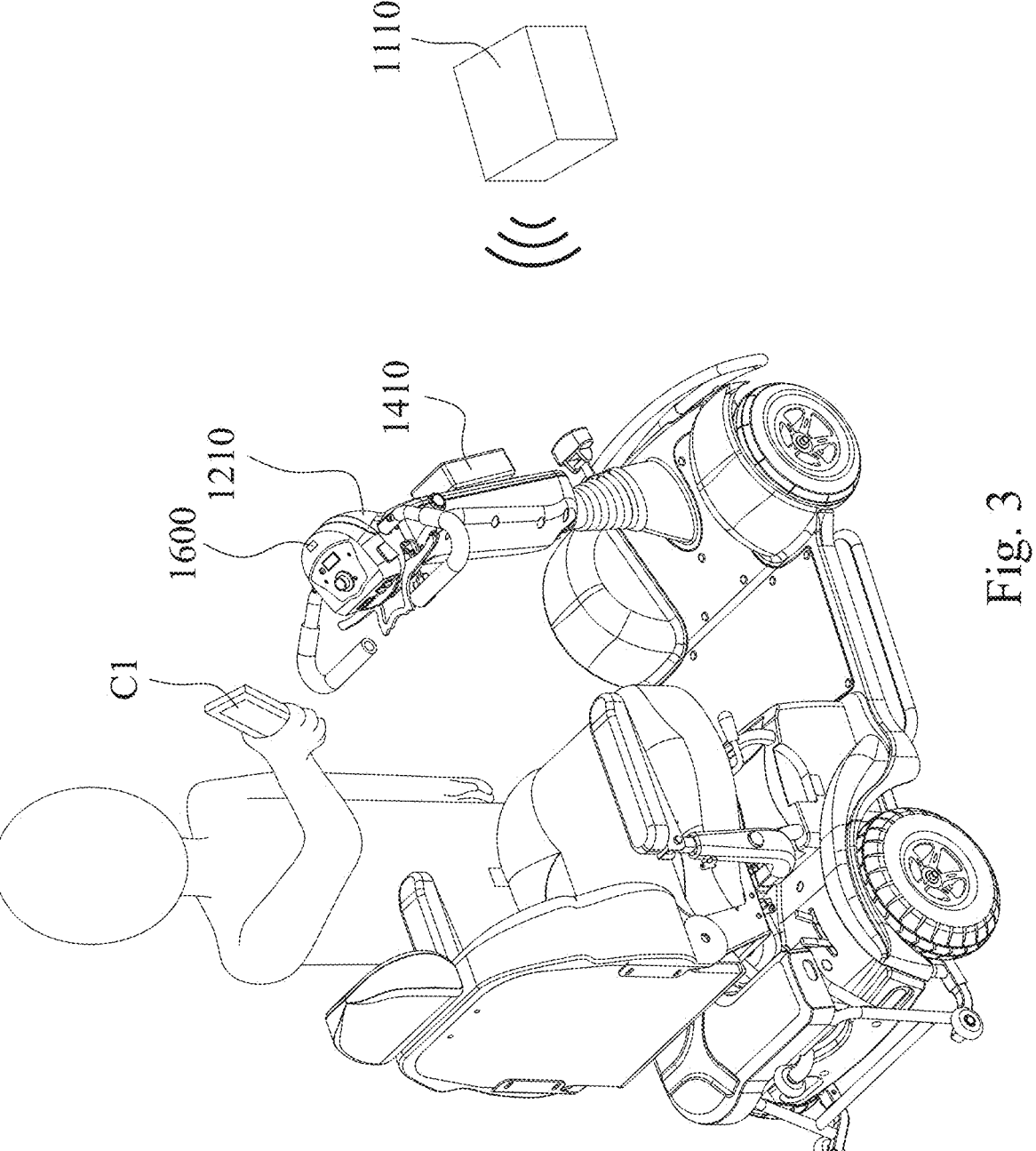
FIG. 3 shows an operating schematic view of the mobility scooter sharing system of FIG. 1 by a user.

FIG. 1 shows a schematic view of a mobility scooter sharing system 1000 according to one embodiment of the present disclosure. FIG. 2 shows a block diagram of the mobility scooter sharing system 1000 of FIG. 1. FIG. 3 shows an operating schematic view of the mobility scooter sharing system 1000 of FIG. 1 by a user. The mobility scooter sharing system 1000 includes a plurality of signal broadcasting devices 1110, 1120, a plurality of mobility scooter groups 1200, 1300, a plurality of renting controlling devices 1410, 1420, 1430, 1440, 1450, 1460, a plurality of device ID marks 1600 and a renting platform 1500.

The signal broadcasting devices 1110, 1120 are respectively located within a plurality of station areas S1, S2, and each of the signal broadcasting devices 1110, 1120 broadcasts a broadcast signal. The mobility scooter groups 1200, 1300 are respectively located within the station areas S1, S2, each of the mobility scooter groups 1200, 1300 includes a plurality of mobility scooters 1210, 1220, 1230, 1310, 1320, 1330, and each of the mobility scooters 1210, 1220, 1230, 1310, 1320, 1330 includes a battery 1211 (only the battery 1211 of the mobility scooter 1210 is illustrated and labeled). Each of the renting controlling devices 1410, 1420, 1430, 1440, 1450, 1460 is disposed at and signally connected to each of the mobility scooters 1210, 1220, 1230, 1310, 1320, 1330, and each of the renting controlling devices 1410, 1420, 1430, 1440, 1450, 1460 includes a device ID and a power switching unit 1412b (only the power switching unit 1412b of the renting controlling device 1410 is illustrated and labeled). The device ID marks 1600 are respectively disposed at the mobility scooters 1210, 1220, 1230, 1310, 1320, 1330 or the renting controlling devices 1410, 1420, 1430, 1440, 1450, 1460, and each of the device ID marks 1600 corresponds to the device ID of each of the renting controlling devices 1410, 1420, 1430, 1440, 1450, 1460. The renting platform 1500 is signally connected to the renting controlling devices 1410, 1420, 1430, 1440, 1450, 1460.

As a mobile device C1 reads the device ID mark 1600 representing the device ID of a selected one of the renting controlling devices 1410, 1420, 1430, 1440, 1450, 1460, e.g., the renting controlling device 1410, corresponding to a rented one of the mobility scooters 1210, 1220, 1230, 1310, 1320, 1330, e.g., the mobility scooter 1210, the mobile device C1 sends a renting signal to the renting platform 1500, and the renting platform 1500 sends an unlock signal to the renting controlling device 1410. The renting controlling device 1410 confirms whether the mobility scooter 1210 is within any of the station areas S1, S2 based on the broadcast signal from any of the signal broadcasting devices 1110, 1120 located therewithin. If the mobility scooter 1210 is judged to be located within any of the station areas S1, S2, the power switching unit 1412b of the renting controlling device 1410 enables the battery 1211 of the mobility scooter 1210. If the mobility scooter 1210 is judged to be not located within any of the station areas S1, S2, the battery 1211 of the mobility scooter 1210 is not enabled.

Therefore, with the communication between the signal broadcasting devices 1110, 1120 and the renting controlling devices 1410, 1420, 1430, 1440, 1450, 1460, whether the mobility scooters 1210, 1220, 1230, 1310, 1320, 1330 are in any of the station areas S1, S2 may be confirmed, and the mobility scooters 1210, 1220, 1230, 1310, 1320, 1330 may only be rented or returned in the station areas S1, S2, thereby favorable for management thereof. Moreover, with enabling the battery 1211 by the renting controlling device 1410, no other mechanical locks are required. The user is easily to rent or return the mobility scooters 1210, 1220, 1230, 1310, 1320, 1330.

As shown in FIGS. 1 and 3, the signal broadcasting device 1110 is located in the station area S1, and the mobility scooter group 1200 including the mobility scooters 1210, 1220, 1230 are also located within the station area S1. The signal broadcasting device 1120 is located in the station area S2, and the mobility scooter group 1300 including the mobility scooters 1310, 1320, 1330 are also located within the station area S2. The renting controlling device 1410 is disposed at a front of the mobility scooter 1210. Similarly, the renting controlling devices 1420, 1430, 1440, 1450, 1460 are respectively disposed at the mobility scooters 1220, 1230, 1310, 1320, 1330 by the same way. Each of the device ID marks 1600 may be a QR code pattern and is disposed at a dashboard of each of the mobility scooters 1210, 1220, 1230, 1310, 1320, 1330, but in other embodiments, the device ID mark can be disposed at the renting controlling device. It is further noted that, in other embodiments, more than two station areas may be established according to the demands, a number of the mobility scooters in a single station area may also be designed according to the demands, and the present disclosure is not limited thereto.

Each of the signal broadcasting devices 1110, 1120 may be a bluetooth beacon and can broadcast its identifier to nearby electronic devices. Each of the renting controlling devices 1410, 1420, 1430, 1440, 1450, 1460 includes a broadcasting communicating module 1411 (only the broadcasting communicating module 1411 of the renting controlling device 1410 is illustrated and labeled) for receiving the broadcast signal from the signal broadcasting device 1110 or the signal broadcasting device 1120, and a renting controller 1412 (only the renting controller 1412 of the renting controlling device 1410 is illustrated and labeled) for signally connected to the broadcasting communicating module 1411, a scooter controller 1212 (only the scooter controller 1212 of the mobility scooter 1210 is illustrated and labeled) and the renting platform 1500. The renting controller 1412 includes a location confirming unit 1412a, and the location confirming unit 1412a and the power switching unit 1412b are signally connected to each other. The renting controller 1412 may be a microprocessor which is programmable to conduct lots of functions.

Each of the mobility scooters 1210, 1220, 1230, 1310, 1320, 1330 may have four tires and at least one motor for driving the tires. The weight of each of the mobility scooters 1210, 1220, 1230, 1310, 1320, 1330 may be about 400 lbs. Taken the mobility scooter 1210 and the renting controlling device 1410 for example, the mobility scooter 1210 may further include the scooter controller 1212, and the scooter controller 1212 is signally connected to the battery 1211 and the motor. Whether a power of the battery 1211 may be provided to the motor is controlled by the scooter controller 1212. The scooter controller 1212 may further be signally connected to the renting controller 1412, and after the power switching unit 1412b sends an enabling signal to the scooter controller 1212, the battery 1211 is unlocked.

Moreover, the scooter controller 1212 may send a battery condition signal of the battery 1211 to the renting controlling device 1410, and the renting controlling device 1410 sends a battery information signal to the renting platform 1500. Precisely, the mobility scooter 1210 may further include a detector signally connected to the scooter controller 1212 to detect a battery percentage of the battery 1211, and the scooter controller 1212 may obtain the battery percentage of the battery 1211 and sends the battery condition signal based thereon to the renting controlling device 1410. Because the renting controlling device 1410 is wirelessly communicated with the renting platform 1500, the renting controlling device 1410 may send the battery information signal to the renting platform 1500, and the renting platform 1500 may obtain the battery percentage of the battery 1211.

The renting controlling device 1410 may further include an electromagnetic brake 1213 signally connected to the scooter controller 1212. If the electromagnetic brake 1213 of the mobility scooter 1210 is in an abnormal position, the renting controlling device 1410 sends a broken signal to the renting platform 1500. To be more specific, as the mobile scooter 1210 is not powered, the electromagnetic brake 1213 locks a motor shaft of the motor of the mobile scooter 1210, and as the mobile scooter 1210 is powered, the electromagnetic brake 1213 is moved to a position that does not lock the motor shaft, and the motor may rotate. Hence, the mobility scooter 1210 may further include a brake position detector connected to the scooter controller 1212 for detecting the position of the electromagnetic brake 1213. Therefore, the position of the electromagnetic brake 1213 may be obtained and judged by the scooter controller 1212, the scooter controller 1212 may send an error signal to the renting controller 1412, and then the renting controller 1412 sends the broken signal to the renting platform 1500.

The renting platform 1500 may include an information module 1510, a renting managing module 1520, a fee calculating module 1530 and a station area managing module 1540 commutated to each other. The information module 1510 is used to receive the broken signal and the battery information signal for obtaining the information of the mobility scooter 1210. The renting managing module 1520 may include a disabling unit 1521. If the broken signal of the mobility scooter 1210 is received or the battery percentage of the battery 1211 is judged to be lower than a battery threshold, e.g., 20%, the disabling unit 1521 disables the mobility scooter 1210, that is, a renting of the mobility scooter 1210 being disabled. The fee calculating module 1530 is used for calculating a fee. The station area managing module 1540 is used to manage the station areas S1, S2. For example, a new station area may be established, and the number of the mobility scooters 1210, 1220, 1230 in the station area S1 and the number of the mobility scooters 1310, 1320, 1330 in the station area S2 may be obtained and be deployed.

As shown in FIGS. 1 to 3, the user uses the mobile device C1 such as a smart phone to close to the device ID mark 1600, and uses an APP to scan the device ID mark 1600 on the mobility scooter 1210 for obtaining the device ID. Then, the renting signal is sent to the renting managing module 1520 of the renting platform 1500, and the renting managing module 1520 checks whether the renting of the mobility scooter 1210 is disabled. If the renting of the mobility scooter 1210 is disabled, the renting managing module 1520 may send a signal back to the mobile device C1 to illustrate a renting disabling mark on the mobile device C1. If the renting of the mobility scooter 1210 is enabled, the renting managing module 1520 may send the unlock signal to the renting controller 1412 of the renting controlling device 1410. The broadcasting communicating module 1411 may keep trying to receive the broadcast signal from the signal broadcasting device 1110, and the location confirming unit 1412a of the renting controller 1412 may check the strength of the broadcast signal. If the strength of the broadcast signal is larger than or equal to a threshold, the location confirming unit 1412a confirms that the mobility scooter 1210 is located within the station area S1, and the power switching unit 1412b of the renting controlling device 1410 enables the battery 1211 of the mobility scooter 1210. Meanwhile, the renting managing module 1520 may send a signal back to the mobile device C1 to illustrate a renting success mark on the mobile device C1. On the other hand, if the strength of the broadcast signal is smaller than the threshold, including the broadcast signal being not received, the renting controller 1412 confirms that the mobility scooter 1210 is not located within the station area S1, and the power switching unit 1412b of the renting controlling device 1410 does not enable the battery 1211 of the mobility scooter 1210. Meanwhile, the renting managing module 1520 may send a signal back to the mobile device C1 to illustrate a renting failure mark on the mobile device C1.

After the mobility scooter 1210 is successfully rented, the user may ride the mobility scooter 1210 and leaves the station area S1. If the user would like to temporarily park the mobility scooter 1210 for a while, the user may operate the mobile device C1, and the mobile device C1 sends a temporary-parking start requesting signal to the renting managing module 1520. After which, the renting managing module 1520 sends a temporary-parking start allowing signal to the renting controller 1412, and the power switching unit 1412b locks the battery 1211 again. If the user finishes the temporary parking and operates the mobile device C1, the renting managing module 1520 may control the renting controller 1412 to unlock the battery 1211 again.

Furthermore, if the user would like to return the mobility scooter 1210, the user may ride the mobility scooter 1210 back to the station area S1 and press the return bottom on the mobile device C1. Then, the mobile device C1 send a return requesting signal to the renting managing module 1520, the renting managing module 1520 sends a return allowing signal to the renting controller 1412, and after confirming that the mobility scooter 1210 is located with the station area S1, the power switching unit 1412b locks the battery 1211 again. The mobility scooter 1210 may also be returned in the station area S2. If the mobility scooter 1210 is confirmed by the renting controller 1412 to be not located in the station areas S1, S2, the renting managing module 1520 sends a signal back to the mobile device C1 to illustrate a return failure mark on the mobile device C1.

A route or a rented time period of the mobility scooter 1210 may be recorded by the mobile device C1 or the renting controlling device 1410 and be sent to the renting platform 1500. A fee rate may be set in the fee calculating module 1530 in advance, and the fee is calculated by the fee calculating module 1530 based on at least one of the route and the rented time period of the mobility scooter 1210. It is noted that, lots of fee rates may be set according to the date or the time, but the present disclosure is not limited thereto.

Figure 4:
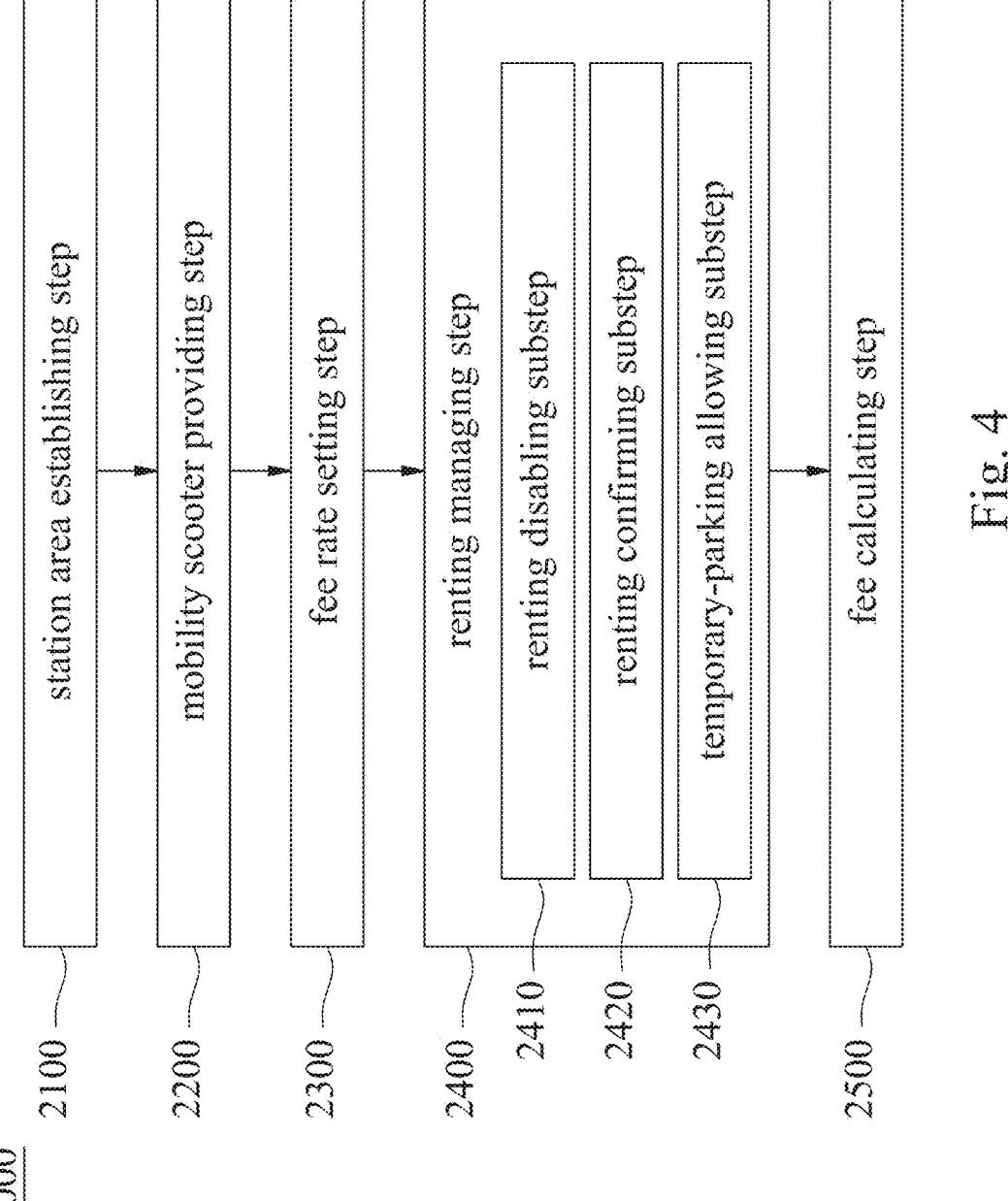
FIG. 4 shows a block flow chart of a managing method for a mobility scooter sharing system according to one embodiment of the present disclosure.

FIG. 4 shows a block flow chart of a managing method 2000 for a mobility scooter sharing system according to one embodiment of the present disclosure. The managing method 2000 includes a station area establishing step 2100, a mobility scooter providing step 2200, and a renting managing step 2400. The managing method 2000 will be described with the mobility scooter sharing system 1000 in FIGS. 1 to 3.

As shown in FIGS. 1 to 4, in the station area establishing step 2100, the signal broadcasting devices 1110, 1120 are respectively disposed in the station areas S1, S2. Each of the signal broadcasting devices 1110, 1120 sends the broadcast signal, and the station areas S1, S2 are recorded in the renting platform 1500.

In the mobility scooter providing step 2200, the mobility scooter groups 1200, 1300 are respectively provided in the station areas S1, S2. Each of the mobility scooter groups 1200, 1300 includes the mobility scooters 1210, 1220, 1230, 1310, 1320, 1330, and each of the mobility scooters 1210, 1220, 1230, 1310, 1320, 1330 includes a battery 1211. The renting controlling devices 1410, 1420, 1430, 1440, 1450, 1460 are respectively disposed at and signally connected to the mobility scooters 1210, 1220, 1230, 1310, 1320, 1330, each of the renting controlling devices 1410, 1420, 1430, 1440, 1450, 1460 is configured to receive the broadcast signal from any of the signal broadcasting devices 1110, 1120, and each of the renting controlling devices 1410, 1420, 1430, 1440, 1450, 1460 includes the device ID and the power switching unit 1412b. The device ID marks 1600 are respectively disposed at the mobility scooters 1210, 1220, 1230, 1310, 1320, 1330 or the renting controlling devices 1410, 1420, 1430, 1440, 1450, 1460, and each of the device ID marks 1600 corresponds to the device ID of each of the renting controlling devices 1410, 1420, 1430, 1440, 1450, 1460.

In the renting managing step 2400, as the mobile device C1 reads the device ID mark 1600 representing the device ID of the renting controlling device 1410 corresponding to the mobility scooter 1210, the mobile device C1 sends a renting signal to the renting platform 1500, and the renting platform 1500 sends the unlock signal to the renting controlling device 1410. The renting controlling device 1410 confirms whether the mobility scooter 1210 is within any of the station areas S1, S2 based on the broadcast signal from any of the signal broadcasting devices 1110, 1120 located therewithin. If the mobility scooter 1210 is judged to be located within any of the station areas S1, S2, the power switching unit 1412b of the renting controlling device 1410 enables the battery 1211 of the mobility scooter 1210. If the mobility scooter 1210 is judged to be not located within any of the station areas S1, S2, the battery 1211 of the mobility scooter 1210 is not enabled.

The station areas S1, S2 may be established by placing the signal broadcasting devices 1110, 1120. Each of the station areas S1, S2 may not have a real boundary, and may be also called a virtual station. The staff of the mobility scooter sharing system 1000 may set the information of the station areas S1, S2, such as the GPS position, the name and the size, in the station area managing module 1540. The mobility scooters 1210, 1220, 1230 may be placed in the station area S1, and the mobility scooters 1310, 1320, 1330 may be placed in the station area S2. It is noted that, a number of the mobility scooters may be defined by the size or a popularity of the station area.

The renting managing step 2400 may further include a renting disabling substep 2410, and the renting of an abnormal one of the mobility scooters 1210, 1220, 1230, 1310, 1320, 1330 is disabled by the renting platform 1500. Precisely, as mentioned above, if the electromagnetic brake 1213 of the mobility scooter 1210 is in the abnormal position, the renting controlling device 1410 sends the broken signal to the renting managing module 1520, and the renting of the mobility scooter 1210 is disabled by the disabling unit 1521 of the renting managing module 1520. Moreover, the renting of a low-powered one of the mobility scooters 1210, 1220, 1230, 1310, 1320, 1330 is also disabled by the renting platform 1500. For example, if the battery percentage of the battery 1211 of the mobility scooter 1210 is judged to be lower than the battery threshold, e.g., 20%, the mobility scooter 1210 is deemed as the low-powered one, and the disabling unit 1521 disables the mobility scooter 1210.

The renting managing step 2400 may further include a renting confirming substep 2420 and a temporary-parking allowing substep 2430. In the renting confirming substep 2420, as the renting managing module 1520 receives the renting signal for renting the mobility scooter 1210, the renting managing module 1520 confirms whether the renting of the mobility scooter 1210 is disabled. If the renting of the mobility scooter 1210 is not disabled, the renting managing module 1520 sends the unlock signal. In the temporary-parking allowing substep 2430, as the renting platform 1500 receives the temporary-parking start requesting signal form the mobile device C1, the renting platform 1500 sends the temporary-parking start allowing signal to the renting controlling device 1410 to disable the battery 1211 of the mobility scooter 1210. As a temporary-parking finish requesting signal is received by to the renting platform 1500 from the mobile device C1, the renting platform 1500 sends a re-enabling signal to the renting controlling device 1410 to re-enable the battery 1211 of the mobility scooter 1210. Therefore, stealing of the mobility scooter 1210 may be avoided.

The managing method 2000 further includes a fee rate setting step 2300 and a fee calculating step 2500. In the fee rate setting step 2300, at least one fee rate is set by the fee calculating module 1530 of the renting platform 1500. In the fee calculating step 2500, the fee of the renting the mobility scooter 1210 is calculated based on the route or the rented time period according to the fee rates. The fee rate setting step 2300 may be exerted before renting, and may be adjusted according to the demands.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A mobility scooter sharing system, comprising:
   a plurality of bluetooth beacons respectively located within a plurality of station areas, each of the bluetooth beacons broadcasting a broadcast signal;
   a plurality of mobility scooter groups respectively located within the station areas, each of the mobility scooter groups comprising a plurality of mobility scooters, wherein each of the mobility scooters comprises a battery;
   a plurality of renting controlling devices, each of the renting controlling devices disposed at and signally connected to each of the mobility scooters, each of the renting controlling devices comprising a device ID, a power switching unit and a location confirming unit signally connected to the power switching unit;

a plurality of device ID marks respectively disposed at the mobility scooters or the renting controlling devices, each of the device ID marks corresponding to the device ID of each of the renting controlling devices; and a renting platform signally connected to the renting controlling devices;

wherein each of the mobility scooters further comprises a scooter controller and an electromagnetic brake, for each respective one of the plurality of mobility scooters, a corresponding one of the scooter controllers is signally connected to a corresponding one of the renting controlling devices, a corresponding one of the electromagnetic brakes is signally connected to the corresponding one of the scooter controllers, and if the electromagnetic brake of an error one of the mobility scooters is in an error position, the renting controlling device of the error one of the mobility scooters sends a broken signal to the renting platform, and a renting of the error one of the mobility scooters is disabled;

wherein as a mobile device reads the device ID mark representing the device ID of a selected one of the renting controlling devices corresponding to a rented one of the mobility scooters, the mobile device sends a renting signal to the renting platform, the renting platform sends an unlock signal to the selected one of the renting controlling devices, the selected one of the renting controlling devices confirms whether the rented one of the mobility scooters is within any of the station areas based on a strength of the broadcast signal from any of the bluetooth beacons located therewithin, if the location confirming unit of the selected one of the renting controlling devices checks the strength of the broadcast signal that is received is larger than or equal to a threshold, the rented one of the mobility scooters is judged to be located within any of the station areas by the location confirming unit of the selected one of the renting controlling devices and a renting of the selected one of the mobility scooters is not disabled, the power switching unit of the selected one of the renting controlling devices enables the battery of the rented one of the mobility scooters, and if the rented one of the mobility scooters is judged to be not located within any of the station areas or the renting of the selected one of the mobility scooters is disabled, the battery of the rented one of the mobility scooters is not enabled.

2. The mobility scooter sharing system of claim 1, wherein for each respective one of the scooter controllers, the corresponding one of the scooter controllers is signally connected to a corresponding one of the batteries and sends a battery condition signal to the corresponding one of the renting controlling devices, and each of the renting controlling devices sends a respective battery information signal to the renting platform.

3. The mobility scooter sharing system of claim 1, wherein the renting platform comprises a fee calculating module, at least one of a route and a rented time period of the rented one of the mobility scooters is obtained by the fee calculating module, and a fee is calculated by the fee calculating module.

\* \* \* \* \*